United States Patent [19]

Abolt et al.

[11] Patent Number: 5,372,717
[45] Date of Patent: Dec. 13, 1994

[54] SEPARATION OF METAL IONS ON AN ANION EXCHANGE RESIN BY CHROMATOGRAPHIC ELUTION

[75] Inventors: Robert B. Abolt, Vail; Gerald D. Knepper, Tucson, both of Ariz.

[73] Assignee: PACT, Incorporated, Tucson, Ariz.

[21] Appl. No.: 94,559

[22] Filed: Aug. 31, 1993

Related U.S. Application Data

[60] Division of Ser. No. 909,009, Jul. 6, 1992, Pat. No. 5,246,591, which is a continuation-in-part of Ser. No. 874,007, Apr. 27, 1992, abandoned, which is a continuation-in-part of Ser. No. 553,444, Jul. 13, 1990, abandoned.

[51] Int. Cl.$^5$ ............................................. B01D 15/08
[52] U.S. Cl. ................................ 210/198.2; 210/96.1; 210/104; 210/143
[58] Field of Search ............... 210/635, 656, 659, 672, 210/684, 198.2, 96.1, 104, 143

[56] References Cited

U.S. PATENT DOCUMENTS

| | | | |
|---|---|---|---|
| Re. 30,066 | 8/1979 | Oberhofer | 210/684 |
| 2,636,044 | 4/1953 | Huffman | 210/684 |
| 2,694,681 | 11/1954 | Bray et al. | 210/24 |
| 2,753,258 | 7/1956 | Burstall | 210/684 |
| 2,797,190 | 6/1957 | Scott, Jr. et al. | 196/147 |
| 2,873,170 | 2/1959 | Hyde | 210/684 |
| 2,962,351 | 11/1960 | Stevenson | 210/684 |
| 2,967,148 | 1/1961 | Karnofsky | 208/310 |
| 3,003,866 | 10/1961 | Mattano | 210/684 |
| 4,335,000 | 6/1982 | Grier | 210/684 |
| 4,605,504 | 8/1986 | Van Elven | 210/198.2 |
| 4,664,810 | 5/1987 | Matejka et al. | 210/672 |
| 4,765,909 | 8/1988 | Rourke et al. | 210/674 |
| 4,770,788 | 9/1988 | Vignola | 210/684 |

FOREIGN PATENT DOCUMENTS

| | | | |
|---|---|---|---|
| 2526247 | 12/1976 | Germany | 210/684 |
| 2602440 | 7/1977 | Germany | 210/684 |

OTHER PUBLICATIONS

Fritz, "Anion Exchange Separations of Metal Ion in Thiocyanate Media", Talanta, (1971), No. 5, vol. 18, pp. 541-548.

Sussman, Metal Recovery by Anion Exchange, Ind. & Eng. Chem., vol. 37, No. 7, Jul. 1945, pp. 618-624.

Snyder, Introduction to Modern Liquid Chromatography, John Wiley, 1979, New York, pp. 619-620.

Faris, Adsorption of the Elements from Hydrofluoric Acid by Anion Exchange, Analytical Chemistry, vol. 32, No. 4, pp. 520-522 (1960).

Marsh, Anion Exchange of 58 Elements in Hydrobromic Acid and in Hydriodic Acid, Report LA-7084, Aug. 1978 by Los Alamos Scientific Laboratory of the University of California, Los Alamos, N. Mex., pp. 1 and 5.

Kraus, Proc. Intern. Conf. Peaceful Uses, Atomic Energy, Geneva, 7, 113 (1956).

"Gradient Elution in Ion Chromatography: Anion Exchange with Conductivity Detection", Dionex, Jan. 1987, pp. 1-7.

"The Metsep Process for the Separation and Recovery of Zinc, Iron, and Hydrochloric Acid from Spent Pickle Liquors", Tunley, Journal of the South African Institute of Mining and Metallurgy, May 1976, pp. 422-427.

"Purification of a Crude Nickel Chloride, Solution by Use of an Ion Exchange Resin Method", The Theory and Practice of Ion Exchange, International Conference, Bozec, Jul. 1976, pp. 43.1-43.7.

"Chemical Separation Methods", John Aurie Dean, published by Van Nostrand Reinhold, 1969, pp. 86-125.

"Anion Exchange Removal of Iron from Chloride Solutions", Reents and Kahler, Industrial and Engineering Chemistry, Jan. 1985, pp. 75-77.

Primary Examiner—Ernest G. Therkorn
Attorney, Agent, or Firm—Norton S. Johnson

[57] ABSTRACT

The present invention relates to the removal of metal ion contaminants as their anionic complexes from a variety of solutions containing said metal ion contaminants on an anion exchange resin, and the separation and purification of the anionic metal complexes by chromatographic elution utilizing a specially designed apparatus that enhances and maximizes the effects caused by different metal complex dissociation constants.

13 Claims, 4 Drawing Sheets

SEPARATION OF METAL IONS ON AN ANION EXCHANGE RESIN BY CHROMATOGRAPHIC ELUTION

CROSS-REFERENCE TO RELATED APPLICATIONS

This is a divisional of application Ser. No. 909,009, filed on Jul. 6, 1992, now U.S. Pat. No. 5,246,591, which, in turn, is a continuation-in-part of Ser. No. 07/874,007, filed Apr. 27, 1992, now abandoned, which, in turn, is a continuation-in-part of Ser. No. 07/553,444, filed Jul. 13, 1990, now abandoned.

FIELD OF THE INVENTION

The present invention relates to the separation of metal ion contaminants from a variety of sources, such as, for example, spent stripper and activator plating solutions which are adsorbed on an anion exchange resin in the form of their anionic complexes and to the recovery, separation and purification of the metals by chromatographic elution.

BACKGROUND OF THE INVENTION

Waste HCl acid solutions (usually 2–5M) containing toxic metals such as chromium, lead, copper, cadmium, etc. are classified as toxic waste. These solutions can come from a number of sources including the electroplating industry, the manufacture of printed circuit boards, the regeneration of cation exchange resins used in cleaning waste waters (including acidic mine drainage water), etc. The most common treatment practice for these toxic solutions in use is neutralization and precipitation which produces insoluble metal hydroxides; this method is costly because the neutralizing agent, usually sodium hydroxide, is relatively expensive. These solutions must then be replaced with new acid at additional expense. Another disadvantage is that the precipitated slurry consists of a mixture of metal hydroxides that has to be disposed of in designated toxic landfills. The disposal costs have been and will continue to rise due to tightening restrictions from the "Land Ban Act." Further, this practice does not stop the generators future liability should problems develop in the disposal facility.

In J. P. Faris, "Adsorption of the Elements from Hydrofluoric Acid by Anion Exchange," *Anal. Chem.*, 32, pp. 520–522 (1960); S. F. Marsh et al., "Anion Exchange of 58 Elements in Hydrobromic acid and in Hydroiodic Acid.," Report LA-7084, August 1978 by Los Alamos Scientific Laboratory; and K. A. Kraus, et al., *Proc. Intern. Conf. Peaceful Uses Atomic Energy, Geneva*, 7, 113 (1956), all of which are incorporated herein by reference, there are described various methods for the removal of anionic metal complexes from many different solutions by adsorption on an anion exchange resin as well as techniques for the analytical separation of some of these metal species. Industrial techniques currently used to remove these anionic metal complexes from the resin do not separate them, thereby resulting in a solution still classified as toxic waste.

BRIEF SUMMARY OF THE INVENTION

According to one aspect of the present invention, there is provided a process for the removal of anionic metal complexes from complexating solutions (i.e., HCl, HF, NaCN, etc.) in which these solutions are contacted with an anion exchange resin to adsorb said metal complexes thereon, which comprises selectively removing the metals therefrom by chromatographic elution, whereby the complexing ion concentration is gradually reduced causing the individual metal complexes to break down as determined by their respective dissociation constants and thus come off of the anion exchange resin in reverse order of the dissociation constants of the individual anionic complexes, effectively separating one from the other.

According to a further aspect of the present invention, there is provided a chromatographic elution column for use in the separation of metal ions on an anion exchange resin comprising a loading section and a finishing section adjoined on the bottom of the loading section, the column being designed to accommodate an anion exchange resin for the purpose of adsorbing anionic metal complexes thereon, means for delivering spent complexating solution, means for delivering any material from a previous cycle that contains more than one metal (such material arising from overlap of two successive waves of pure solutions) to the top of the column, means for delivering deionized water solution, as a preferred embodiment, to the top of the column and allowing both the complexating solution, recycle solution and the deionized water to flow downwardly through said resin, whereby the eluting system successively removes and separates the metals, as metal salts in solution from the complexating solution, the design of the finishing section being to enhance the separation of the metal ions through extension of the natural chromatographic effects of the process.

Examples of metal contaminants are iron, zinc, cadmium, copper and others as shown in the above referenced materials which form anionic complexes. Some embodiments and preferred embodiments are those in which: the finishing column ordinarily being greater than 4 inches in length, about 30 inches being the preferred, the flow velocity of the eluting solution is between about 0.5 gallons per minute per square foot of column cross sectional area (0.5 gpm/ft$^2$) and 5 gpm/ft$^2$, and the preferred flow velocity is about 1.7 gpm/ft$^2$ at 20° C.; the temperature of the eluting solution is between about 0° C. to 80° C.; the anion-exchange resin is a macroporous strong basic type I or II anion resin for higher flow velocities and a gel type strong basic resin for very slow flow velocities; and the complexating solution is added to the top of a chromatographic column which contains a loading section and a sharpening section approximately 30 inches long adjoined to the bottom of the loading section; both sections containing an anion exchange resin, and eluted with deionized water at a flow velocity between 0.5 and 5 gpm/ft$^2$ and at a temperature between about 0° and 80° C. whereby the contaminating metals are successively separated. Any overlap between two successive waves of pure solution in one cycle is returned to the top of the column at the start of the elution phase of the next cycle. This allows for a more gradual decrease in complexing anions (this recycle solution contains more complexing anions than deionized water) during the initial stages of the chromatographic elution while simultaneously increasing the overall yield of separated metals to 100%.

The present invention is based upon the discovery that it is possible to separate the metals loaded on the resins that are usually found in spent hydrochloric acid plating solutions as their chloro complexes, such metals being iron, zinc and cadmium, into eluates rich in an individual metal. The eluted fractions can be sold to the chemical industry either as solutions containing the individual metal ions, as precipitates of individual metal hydroxides or as the electrolytically recovered metal itself.

The present invention is applicable not only to spent plating solutions as hereinbefore described, but may also be applied with equal facility to other areas besides the metal finishing industry as well as other complexing systems.

Thus, for example, in the treatment of industrial waste water and acid mine drainage waters, ion exchange processes are used to extract the metal ions from the water. The resin is then regenerated with hydrochloric acid which becomes contaminated with iron, zinc, copper, cadmium and other toxic metals that are present in the waste water. This acid can be treated with the present process and in the same manner as other waste hydrochloric acid.

Other applications include but are not limited to: the treatment of waste solutions from the printed circuit board industry and processing of leachates in the mining industry.

Another application of the present invention is in the separation of rare earth elements. Current technology loads these elements on an anion exchange resin as their chloro complexes and then elutes them by passing different solutions through the columns that contain different quantities of chloride ions. Using the chromatographic process of this invention, only one instead of multiple elution solutions are needed and the total amount of elution solution is substantially reduced. Additionally, the time required for elution is greatly reduced and, accordingly, operating costs are significantly lower. Recovering separated metal ions from any process that allows transition metal ions or rare earth metal ions to be loaded on an anion exchange resin as chloro complexes can be improved by the presently described process and integrally necessary apparatus.

DETAILED DESCRIPTION OF THE INVENTION

Figure 1:
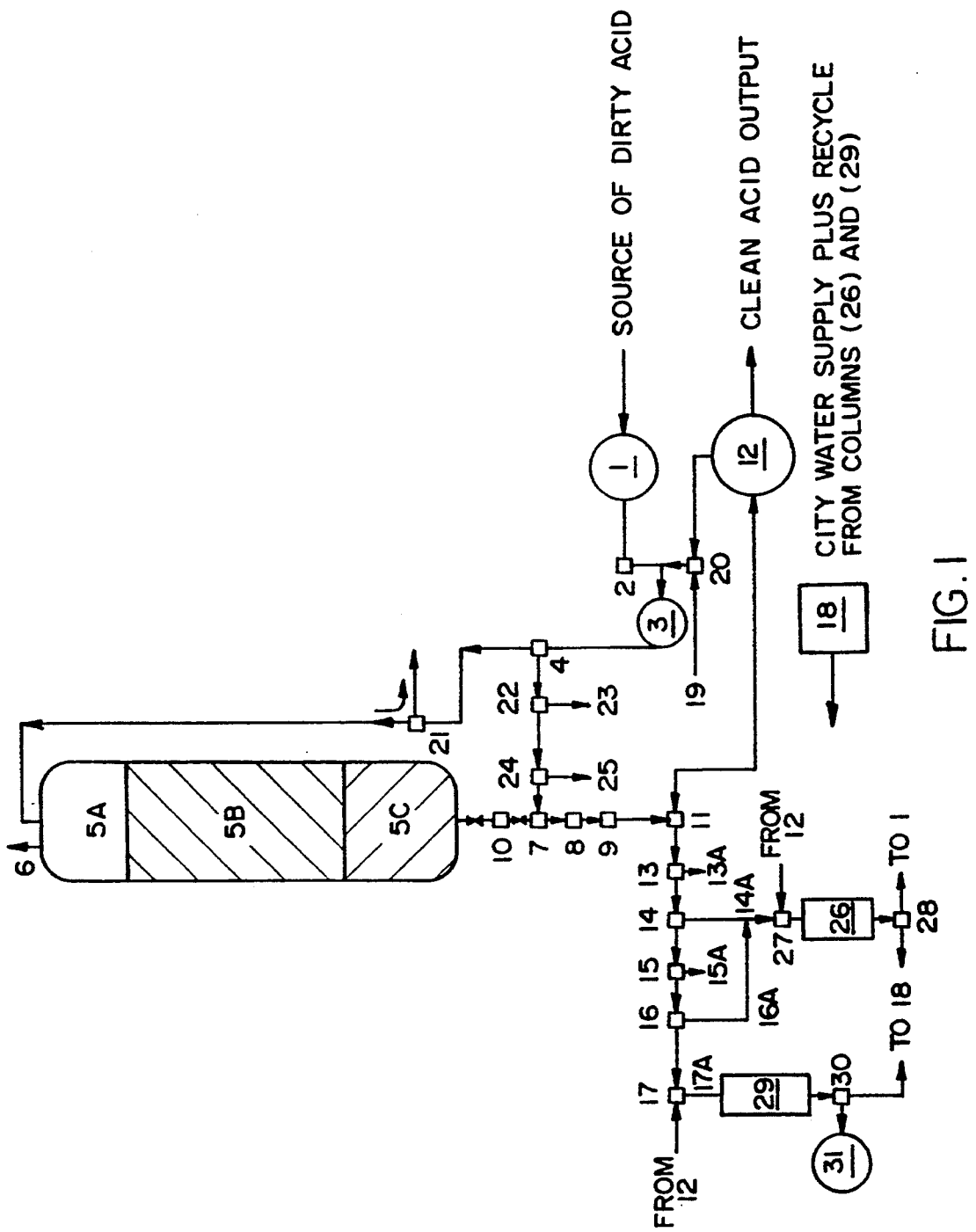
FIG. 1 shows the specialized ion exchange column for use in carrying out the process of the present invention.

At the outset, it should be noted that the metals that are usually found in spent hydrochloric acid stripping solutions, for example, as their chloro complexes are $([M^{n+}Cl_x]^{p-})$, where $M^{n+}$ is $Fe^{3+}$, $Zn^{2+}$ and $Cd^{2+}$.

The formation constants of the metal chloro complexes as well as the equilibrium constants for the distribution of these complexes between the aqueous phase and the resin phase, govern the separation of these metal complexes on the anion exchange resin. The chloride ion concentration in the aqueous phase and hence, the molarity of the hydrochloric acid in the aqueous phase has a profound influence on the separability of these chloro complexes.

The formation constants of the chloro complexes decrease in the following sequence: $Cd^{2+} > Zn^{2+} > Fe^{3+}$. On the basis of the equilibria involved, it is expected that the $Cd^{2+}$ complexes will be strongly retained on the resin whereas the $Fe^{3+}$ and $Zn^{2+}$ will be less strongly retained. Separation of these metals is accomplished by varying the $[Cl^-]$ in the solution surrounding the resin. As the $[Cl^-]$ drops $Fe^{3+}$ complexes break down and the $Fe^{3+}$ comes off the resin while the $Cd^{2+}$ and $Zn^{2+}$ complexes remain. The $Zn^{2+}$ complexes break down as the $[Cl^-]$ is dropped further. Finally, the $Cd^{2+}$ complexes break down when the $[Cl^-]$ has been lowered almost to zero. The solution coming off the column is separated into fractions containing only one metal ion species.

The $[Cl^-]$ in the solution around the resin is reduced by the addition of deionized water at the top of the column. As this water passes the first resin it picks up excess $Cl^-$ ions from the resin. The water also picks up metal ions from complexes that are broken down due to the drop in $[Cl^-]$. As the solution continues through the column the $[Cl^-]$ builds up, rapidly reaching a level that can put the $Cd^{2+}$ chloro complexes back on the resin. The $[Cl^-]$ continues to build up in this first volume of eluate until all of the the metal chloro complexes have been readsorbed onto the resin with any excess metal complexes readsorbed in the finishing section. When the first volume of solution exits the column, it is free of metals and has an HCl concentration of between 4 and 5 moles/liter. The next volume of water travels further through the column before the metals are readsorbed. As the process continues bands of metals form and travel slowly down the column with $Fe^{3+}$ first, then $Zn^{2+}$ and $Cd^{2+}$ last. The first effluent from the column is uncontaminated HCl. This changes to a solution of pure $FeCl_3$ when sufficient $[Cl^-]$ is removed from the ion exchange resin. The $FeCl_3$ is followed by a solution of pure $ZnCl_2$ and finally a solution of pure $CdCl_2$.

The nature of the process requires the flow velocity of the solution past the ion exchange media to be slow enough for the $[Cl^-]$ to be uniform in the media allowing only one species of metal chloro complex to break down at a time, and slow enough for the metal ions to diffuse out of the resin into the solution. If the velocity is too high, some of the $Fe^{3+}$ ions will still be diffusing out of the resin when the $Zn^{2+}$ complexes are breaking down. A velocity of 1.7 gpm/ft² is sufficiently low to allow these processes to take place at 15° C. to 25° C. with a standard macroporous resin. Gel type resins require much longer diffusion times and therefore much slower flow velocities. Special high kinetic resins such as Rohm and Haas IRA-938 have shorter diffusion times and therefore higher flow velocities can be utilized.

The formation and decomposition of the chloro complexes are equilibrium reactions, they break down and reform continuously with the concentrations of each species reaching an equilibrium level which is a function of the equilibrium constants. Consequently, if the column is loaded all the way to the bottom some of the complexes will break down and wash out before they can be reformed and readsorbed on the resin. To prevent this bleedout of metals, the bottom section of resin is left unloaded. This novel technique provides for high purity in the individual metal chloride effluent solutions. The length of this wave sharpening section is a function of the purity required and the flow velocity in the column. Preferably, it should be 30 inches (76.2 cm) for the flow velocity necessary for this process but as will be pointed out later other lengths for the finishing section may be employed.

Separation quality is determined by the yield of each metal in the 99% purity fraction calculated as:

$$\frac{[Mi^{+n}]_{zone}}{[Mi^{+n}]_{zone} + [Mi^{+n}]_{mix} \times V_{mix}} \times 100 = \text{yield } (\%)(Y)$$

where $[Mi^{+n}]_{zone}$ = average concentration of species within the 99% purity fraction zone = volume of 99% purity fraction $[Mi^{+n}]_{mix}$ = average concentration of species within the mixed fraction $V_{mix}$ = volume of mixed fraction Separation quality drops as the flow velocity is increased and it increases with increasing the length of the sharpening section.

The temperature of the deionized water used in the elution has an effect on the separation quality. Higher temperatures increase the diffusion rate thereby increasing the separation quality at a fixed flow velocity and a fixed sharpening section length. Example III hereinafter demonstrates that the separation quality can be maintained at a high level even with a high flow velocity (2.5 gpm/ft$^2$) when the temperature of the elution water is raised to 110° F.

OPERATION OF THE INVENTION AS CARRIED OUT IN THE APPARATUS SHOWN IN FIG. 1

1. One embodiment of the apparatus is shown in FIG. 1. The column is loaded with 75 liters of a macroporous strongly basic anion exchange resin such as Dow-M41 or Rohm and Haas Amberlite IRA-938 as supplied in the chloride form. Sixty liters of this resin constitutes the loading section of the column (5B) and 15 liters constitutes the sharpening section (5C). The resin is washed with water supplied from the deionized system (18) through line (19) valve (20) pump (3) valves (4) and (21) and preconditioned with 25 liters of 18% HCl from tank (12) in the same fashion. The water rinse is returned through valves (7) and (22) line (23) to the deionized water system (18). The acid is returned through valves (7) and (24) line (25) to tank (12). Effluent flow is switched from water to acid lines based on sensor (10).

2. The spent pregnant acid is pretreated to remove particles greater than 10 microns and organic compounds such as grease, oil or wetting agents. Organic removal may be accomplished with activated carbon filters or through a solvent extraction/recovery operation or through any other suitable means. Next, the spent acid is treated with $H_2O_2$ to convert the ferrous ions to the ferric state and concentrated to 18% by the addition of HCl gas or by evaporation and subsequent addition of 32% HCl.

3. The concentration of metals in the spent acid is determined and the volume of solution that will load only the top 2 meters of the resin bed is calculated as shown:

$$\frac{[Fe] \text{ gm/l}}{55.8 \text{ gm/mole}} + \frac{[Zn] \text{ gm/l}}{65.4 \text{ gm/mole}} + \frac{[Cd] \text{ gm/l}}{112.4 \text{ gm/mole}} =$$

$$\frac{\text{number of moles}}{\text{N chloro complexes}}$$
$$\text{liter of solution}$$

-continued 60 liters of resin in loading section $\times$ 0.7 moles/liter capacity = 42 moles $\frac{42}{N}$ = number of liters of spent acid to be loaded This volume is then pumped from tank (1) valve (2) by pump (3) through valve (4) to top of column (5) at a flow velocity of 1.7 gpm/ft$^2$ or 1.3 Lpm for 160 mm diameter column used. The clean acid exits through valve (7) flow rate control valve (8) flow meter (9) valve (11) to clean acid tank (12).

4. Immediately following the spent acid, deionized water from (18) is pumped through line (19) valve (20) pump (3) valves (4) and (21) to the top of the column (5). The flow rate remains the same. The effluent is monitored by sensor (10) for Fe$^{3+}$ so that when it contains more than 100 ppm iron the flow is switched from the clean acid tank (12) to the FeCl$_3$ tank through valves (11), (13) and line (13A). The volume of FeCl$_3$ solution on any run is dependent on the proportion of Fe in the spent acid relative to the other metals.

5. The FeCl$_3$ solution is monitored by sensor (10) for Zn. When the Zn in the solution is above 50 ppm the flow is switched to a mixed metal tank through valve (14) to line (14A). At this point the concentration of Fe has typically dropped from a peak of between 10 and 25 g/l to less than 300 ppm. The flow is switched to the ZnCl$_2$ tank (not shown) through valve (15) and line (15A) when the Fe concentration has dropped to 50 ppm. The volume of mixed metal solution is small and it contains only small quantities of Fe and Zn. This solution is concentrated with cation exchange column (26) which is eluted with acid from tank (12). The eluate is returned to tank (1) for reprocessing.

6. The ZnCl$_2$ solution contains between 5 and 15 g/l Zn$^{2+}$. The effluent is now monitored by sensor (10) for Cd. When the [Cd] exceeds 50 ppm the flow is switched from line (15A) to the mixed metal tank again through valve (16) and line (16A) until the [Zn] has dropped to less than 50 ppm. Then effluent flow is switched to line (17). The volume of this mixed metal solution is also small as are the quantity of metals. This solution is also concentrated in cation exchange column (26) in the same manner as before (step 5).

7. The CdCl$_2$ is monitored by sensor (10) for [Cd] and the elution is complete when the [Cd] drops below 10 ppm. Depending on the relative concentration in the spent acid the [Cd] in the majority of the CdCl$_2$ solution is between 150 and 1500 ppm. The pH of this solution is between 3 and 4. This solution is passed through cation exchange column (29) removing the Cd, then through valve (30) back to the deionized water system (18). Cation exchange column (29) is eluted with HCl acid from tank (12) and the eluate CdCl$_2$ with a concentration of approximately 10 gm/l flows through valve (30) to storage tank (31).

8. Deionized water (75 liters) from system (18) is pumped by pump (3) upflow through valves (4), (22), (24) and (7) to the bottom of column (5) to restratify the resin bed for better flow dynamics. Any gas such as air is vented through relief valve (6) at this time.

9. The resin is still in the Cl$^-$ form but the solution in and around the resin beads has to be reconditioned to high [Cl$^-$] prior to the start of the next cycle. This is accomplished by pumping 25 L of clean 18% HCl from tank (12) downflow through the column at 8 Lpm exiting through valves (7) and (24) line (25) to tank (12) when sensor (10) indicates acid instead of water. The high flow rate packs the resin to prevent channels from forming. The system is now ready for the next cycle.

The invention will be described in greater detail in conjunction with the following specific examples. It is to be understood however that while the present invention is described in detail in the specific examples as dealing with spent plating solutions containing high concentrations of heavy metal ions in hydrochloric acid solutions generated by the metal finishing industry, the invention is not limited to such solutions but as hereinbefore described may be applied with equal facility to other areas where it is desired to remove metal contaminants such as in the treatment of waste water or industrial process water and in the separation of rare earth metals where ion exchange processes are used to separate various metals as their chloro complexes. Nor is the invention limited to chloro complexes. Any anionic metal complexing system can be utilized by the invention according to the distribution coefficients as outlined in the referenced materials and according to their respective dissociation constants.

It is also to be understood that while standard tap water can be used in accordance with the present invention to lower the concentration of the complexing agent thereby eluting the metals removed from the complexing solution, deionized water is used for this purpose in a preferred embodiment thereof, thereby providing a cleaner eluted fraction for use by the chemical industry. It will be appreciated that in some cases the use of distilled water or water purified by reverse osmosis will provide an eluted fraction that meets most technical grade chemical standards. This is really a matter to be determined by the use to be made of the eluted fraction and will be dictated by the current market conditions or specific customer needs.

EXAMPLE I

For testing purposes a 1.5" diameter column is set up (identical to the one described previously), and loaded with 4 liters of Dow M41 resin, 3 liters in the loading section and 1 liter in the sharpening section (30 inches). Five liters of spent activator bath from a local plating shop is pretreated and loaded on the column. Deionized water (20° C.) is run through the column at 80 ml/minute (1.7 gpm/ft$^2$). Samples are taken of each volume fraction of effluent and then analyzed for metal content. 1.0 liter of clean 4M HCl constitutes the first fraction. 1.75 liters of FeCl$_3$ containing 22.8 gm or 95.2% of the iron loaded and 93 mg of zinc constitutes the second fraction. A volume of 0.25 liters of mixed metal ion solution containing 0.48 gm Zn and 0.42 gm Fe constitutes the third fraction. 12.5 liters of ZnCl$_2$ solution containing 71.3 gm Zn or 99.1% of the Zn loaded and 0.64 gm of Fe plus 0.3 gm Cd for a purity of 98.7% constitutes the fourth fraction. 0.5 liters of a mixed metal ion metal solution containing 100 mg Zn and 200 mg Cd constitutes the fifth fraction. 30.5 liters of CdCl$_2$ solution containing 13.4 gm Cd and 120 mg Zn constitutes the sixth and last fraction. These results are shown in Table I below.

TABLE I

| Fraction | Volume (ml) | Fe (gms) | Zn (gms) | Cd (gms) | | |
|---|---|---|---|---|---|---|
| 1 | 1,900 | 0.10 | 0.01 | — | Recycle | |
| 2 | 1,750 | 22.8 | 0.09 | — | Fe Fraction | p = 99.6% y = 95.2% |
| 3 | 250 | 0.42 | 0.48 | — | Recycle | |
| 4 | 12,500 | 0.64 | 71.30 | 0.30 | Zn Fraction | p = 98.7% y = 98.7% |
| 5 | 500 | — | 0.10 | 0.20 | Recycle | |
| 6 | 30,500 | — | 0.12 | 13.40 | Cd Fraction | p = 98.8% y = 96.4% |

Where: p = purity
y = yield

EXAMPLE II

This example shows how the length of the sharpening section affects the separation quality. The apparatus, flow velocity and temperature used in Example I are kept the same. Eight liters of the same spend acid is passed through the column thereby loading 60% more metal ions onto the resin reducing the sharpening section (visual determination) to approximately three inches.

The quantities of metal in each fraction are shown in Table II below. The yields in the 98% purity fraction dropped 2–4% from Example I which reflects the increased overlap of the zones. However, the yields remain above 93%.

TABLE II

| Fraction | Volume (ml) | Fe (gms) | Zn (gms) | Cd (gms) | | |
|---|---|---|---|---|---|---|
| 1 | 550 | 0.04 | — | — | Recycle | |
| 2 | 3,250 | 37.10 | 0.60 | — | Fe Fraction | p = 98.4% y = 93.6% |
| 3 | 500 | 2.20 | 3.00 | — | Recycle | |
| 4 | 11,250 | 0.28 | 94.50 | 0.65 | Zn Fraction | p = 98.9% y = 94.8% |
| 5 | 1,000 | — | 1.30 | .42 | Recycle | |
| 6 | 30,000 | — | 0.33 | 14.90 | Cd Fraction | p = 97.8% y = 93.3% |

Where: p = purity
y = yield

EXAMPLE III

This example shows how hot water elution allows increased flow velocity without a drop in separation quality. The same apparatus is used but the flow velocity is increased to 120 ml/min. Five liters of the same spent acid is passed through the column loading the resin with metal ions. The deionized water is heated to 50° C. and then run through the column. The results are shown in Table III below. The yields for this example are higher than Example I.

TABLE III

| Fraction | Volume (ml) | Fe (gms) | Zn (gms) | Cd (gms) | | |
|---|---|---|---|---|---|---|
| 1 | 2,000 | 0.07 | — | — | Recycle | |
| 2 | 2,000 | 24.60 | 0.04 | — | Fe Fraction | p = 99.8% y = 96.7% |
| 3 | 500 | 0.65 | 0.75 | — | Recycle | |
| 4 | 12,750 | 0.11 | 59.70 | 0.04 | Zn Fraction | p = 99.7% y = 97.6% |
| 5 | 1,100 | — | 0.54 | 0.25 | Recycle | |
| 6 | 25,000 | — | 0.15 | 11.10 | Cd | p = 98.6% |

TABLE III-continued

| Fraction | Volume (ml) | Fe (gms) | Zn (gms) | Cd (gms) |
|---|---|---|---|---|
| | | | | Fraction y = 97.5% |

Where: p = purity
y = yield

OPERATION OF THE INVENTION AS CARRIED OUT IN THE APPARATUS SHOWN IN FIG. 3

Figure 2:
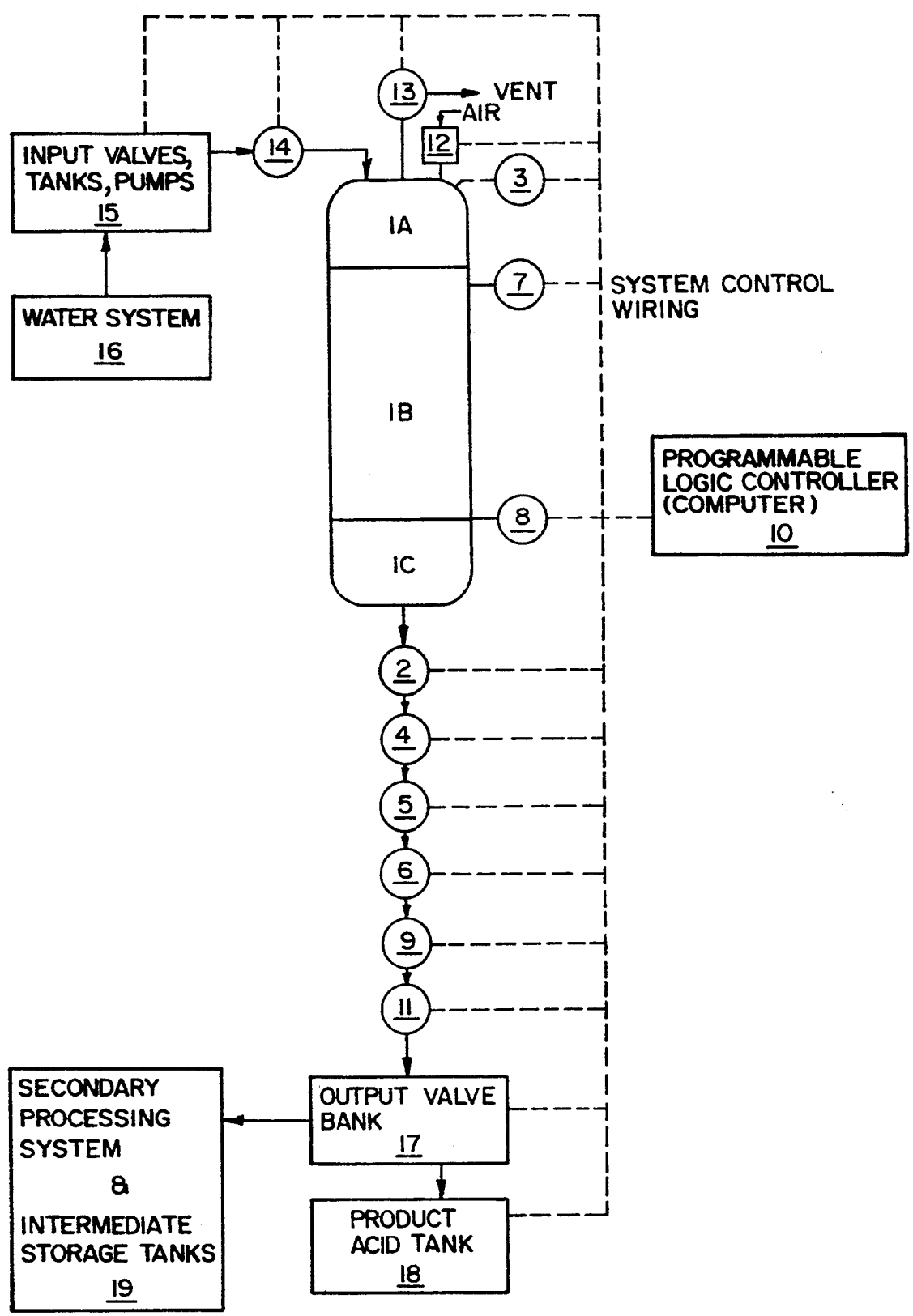
FIG. 2 shows a second embodiment of the apparatus necessary for carrying out the process of the present invention.

A second embodiment of the apparatus is shown in FIG. 2. An 18 inch diameter column, 13.5 feet in length, is loaded with 500 liters of a macroporous strongly basic anion exchange resin such as Dow M-41 or Rhom and Haas IRA-938 as supplied in the chloride form. 375 liters of this resin constitutes the loading section of the column (1B) and 125 liters constitutes the sharpening section (1C) leaving approximately three feet of head space (1A). Sensors that measure flow rate (2), column pressure (3), temperature (4), pH (5), conductivity (6), solution level in the head space (7), and metal concentration at the end of the loading section (8) and in the eluate (9) are monitored with a process control computer (10). The computer can be an IBM PC (or compatible) with analog and digital IO capability or a standard Programmable Logic Controller such as an Opto 22, Mystic 100 or 200. The computer operates the valves and pumps to direct the flow of input solutions and the column output eluate solutions based on the inputs from the sensors in accordance with preprogrammed software.

The sensors (8) and (9) may be, but are not limited to optical sensors, conductivity sensors, oxidation-reduction potential sensors, pH sensors, x-ray fluorescence analyzers, or infrared detector.

Figure 3:
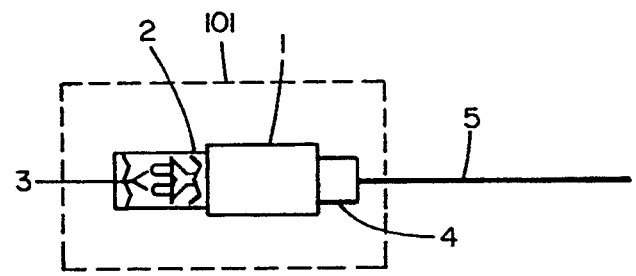
FIGS. 3-6 show various components of the sensor system.
Figure 4:
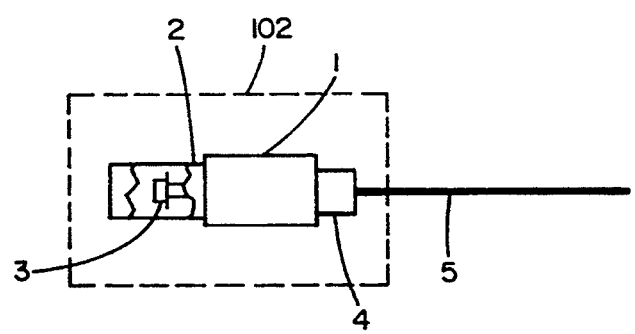
Figure 5:
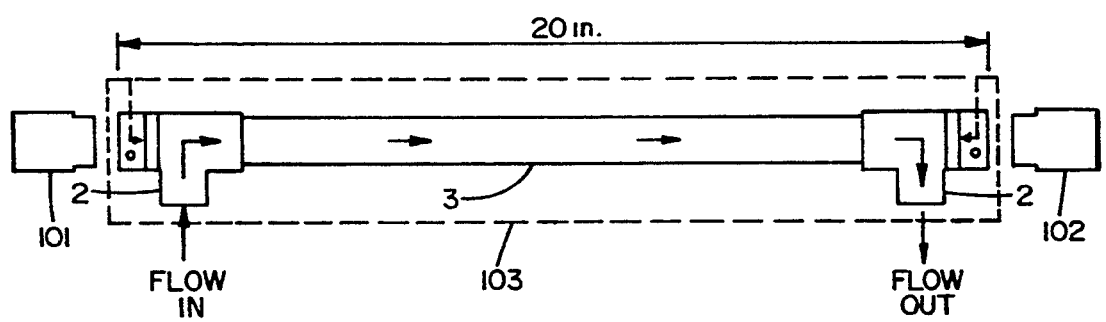

Preferably, the sensors (8) and (9) each comprises an opacity detector as shown schematically in FIG. 5 consisting of a light source (101) and a photocell (102) mounted in a tube (103) through which a sample of the fluid in the column at (8) or (9) passes at the end of the loading section (1B) and the output of the column (1C). In a preferred embodiment, the light source (101) consists of one or more light emitting diodes (FIG. 3) and the photocell (102) consists of a photodiode (FIG. 4) whose resistance varies according to the intensity of light passing from the light source through a sample of the fluid in the column.

Figure 6:
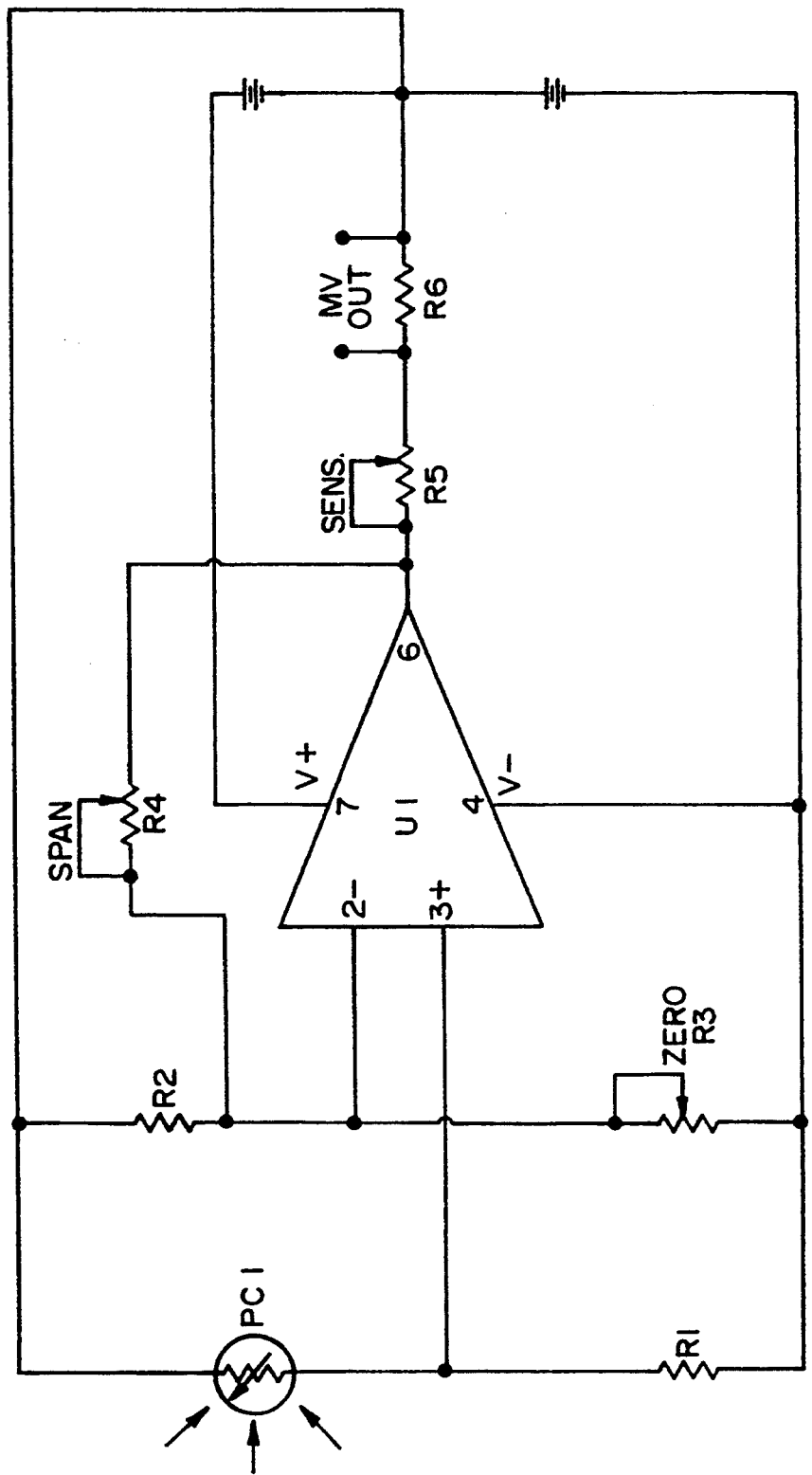

The photodiode is connected in a suitable circuit for producing an electric signal responsive to changes in the resistance of the photodiode, thus a measure of the opacity of the sample of fluid. A suitable circuit is shown in FIG. 6, wherein the photodiode PC1 is connected in a balanced bridge circuit for producing an output suitable for controlling the computer. Advantageously, the light source is chosen to produce a colored light matching that of the metal ion to be detected. For example, a green light will enhance the sensitivity and detection of chromium ions at point (8).

1. The spent pregnant acid is pretreated to remove particles greater than 1.0 microns and organic compounds such as grease, oil or wetting agents. Organic removal may be accomplished with activated carbon filters or through a solvent extraction/recovery operation or through any other suitable means. Next, the spent acid is treated with $H_2O_2$ or $O_2$ or $Cl_2$ to convert the ferrous ions to the ferric state and concentrated to 18% by the addition of HCl gas or by evaporation and subsequent addition of 32% HCl.

2. Directed by the computer, 40 gallons of 5.0M hydrochloric acid is pumped to the top of the column to regenerate the resin bed. Output is directed to the low zinc or the cadmium subsystem as determined by the presence of cadmium in the spent acid previously loaded.

3. The computer directs the spent acid to the top of the column after allowing the level of clean regenerant acid in the column to fall just above the top of the resin in order to minimize mixing of the two dissimilar solutions utilizing level detector (7). Additional spent acid is added to the column and again allowed to fall to just above the top of the resin as is done in all similar instances throughout the run. The flow of spent acid is continued until the sensor at the bottom of the loading section detects the presence of metal ions which indicates that the resin is now loaded to the desired amount.

4. The computer regulates flow control valve (11) thereby maintaining the flow velocity through the resin at the desired value. The computer also regulates the pressure in the top of the column by either addition of pressurized air, valve (12), or venting of excess pressure, pressure relief valve (13), thereby assisting the flow control by providing positive constant pressure on the solution of the column.

5. Next the computer directs a twenty-five gallon metal-free 5.0 hydrochloric acid plug to be pumped to the column to elute any unretained cation, i.e. $Cr^{+3}$.

6. With the completion of the clean acid plug, 100 gallons of a Mixed-metal/Recycle solution (acquired during the mix phases of the previous run) at a pH of 2.0 is added to the column to increase the effective metal recovery yield to 100%; an on-line flow meter (14) signals the 100 gallons addition.

7. The computer next directs deionized water to the column through input valve bank (15) from water system (16).

8. A conductivity sensor (6) indicates the presence of the eluting hydrochloric acid, causing the computer to direct the output flow through the output valve bank (17) to the product acid recovery tank (18).

9. A sensor (9) (an XRF, colorimeter, on-line titrator, or other applicable device) indicates the presence of iron or iron/copper mix in the eluate, directs the computer to switch the output valve bank (17) to direct the flow to the appropriate secondary processing system (19).

10. Input from the sensor indicating a decrease in metal concentration of a particular fraction signals the computer to direct the eluate through the appropriate valve to the Mixed-metal/Recycle Tank (19) until the sensor no longer detects the presence of the metal.

11. In the absence of metals being detected by the sensor (9), the computer directs the eluate into the zinc or zinc/lead recovery tank (19) until the conductivity sensor (6) reaches a certain level.

12. Directed by input from the conductivity sensor (6) the computer switches the appropriate valve to direct the eluate to the low level zinc subsystem (19).

13. Should cadmium be present in the original impregnated acid, the eluate sensor (9) signals the arrival of cadmium in the eluate and directs the computer to switch the appropriate valve to the cadmium subsystem (19) and maintains this configuration until cadmium is no longer being detected.

14. When all of the above criteria have been met, the computer instructs the system to shut itself down.

Although the loading section (1B) and finish-section (1C) are preferably contained in the same chamber or column, it is contemplated that in certain installations these two sections may be located in separate chambers suitably linked by a pipe or tubing to carry the fluids from one to the other. In this case, the sensor (8) may be located in the connecting pipe or tubing.

EXAMPLE IV

For testing purposes, an 18″ diameter column as described by the second embodiment, as represented by FIG. 2 is set up and directed by the computer, 40 gallons of 5M hydrochloric acid is pumped to the top of the column to regenerate the resin bed. Next, 155 gallons of 5M hydrochloric acid, previously conditioned to oxidize ferrous ions to ferric ions and filtered with a 1.0 micron filter to remove particulates, contaminated with 0.90 g/L chromium, 8.5 g/L iron, 2.4 g/L copper, 9.6 g/L zinc and 0.19 g/L cadmium is loaded onto the column. Following this, 25 gallons of metal-free hydrochloric acid is added to the column to elute any unretained species, i.e. chromium. Next 100 gallons of a Mixed metal/Recycle solution from a previous run at a pH of 2.0 is added to the column to increase the effective metal recovery yield to 100%. Finally, deionized water at 60° C. is added to the column continuously until the cycle is complete. Samples are taken of each volume fraction of effluent and then analyzed for metal content. 145 gallons of 5.0M hydrochloric acid with 96 ppm chromium constitutes the first fraction. 50 gallons of $FeCl_3$ and $CuCl_2$ with 25.03 g/L or 95.0% iron and 7.14 g/L or 96.0% copper with 2 ppm zinc constitutes the second fraction. 25 gallons of Mixed-metal/Recycle solution with 2.6 g/L iron, 0.595 g/L zinc constitutes the third fraction. 521 gallons of $ZnCl_2$ of 2.78 g/L or 97.3% of the zinc loaded onto the column with 7 ppm iron and 5 ppm copper constitutes a fourth fraction. 75 gallons of a second Mixed-metal/Recycle solution with 0.139 g/L zinc and 9 ppm cadmium constitutes the fifth fraction. And 70 gallons of $CdCl_2$ with 0.413 g/L or 97.6% of the cadmium loaded and 4 ppm zinc constitutes the sixth and final fraction. These results are shown in Table IV below.

This example demonstrates that the invention can be performed on the larger scale represented by the second embodiment and that the use of a process control computer enhances the overall effectiveness of the invention. Also in some cases, it is necessary to elute two metals with similar properties simultaneously which in no way limits the invention's applicability.

plating industry, the waste water treatment industry or any solution with a concentration of complexing ions contaminated with heavy metals such as in rare earth element separation. The process is applied after first adsorbing the toxic metals as anionic complexes on an ion exchange resin thereby cleaning the solution for reuse. The invention then separates the metals from each other through an elution process that involves gradually lowering the complexing ion concentration by the addition of water in the solution surrounding the resin causing the individual metal complexes to break down and wash out of the ion exchange column in concentrated high purity solutions of metal salts.

The separation of these metals in this process requires a specially designed and operated ion exchange column requiring:

A) a flow velocity sufficiently low to allow the diffusion of the ions into and out of the resin beads to reach completion before each incremental column of solution passes on to the next incremental volume of resin; and B) a sharpening section of ion exchange resin at the bottom of the column that was not loaded with any metal complexes in the initial cycle of operation thereby preventing premature bleeding of the more stable metal complexes into the fractions of clean solution and the less stable metal complexes that are the first to wash out of the column.

While the present invention has been particularly described in connection with a length of the sharpening section of the column of about 30 inches, it is to be understood that different lengths may be employed if desired. Thus sharpening sections of from about 4 inches or greater in length can be used to effect excellent separation of the metals.

Moreover, while the flow velocity of the solution past the ion exchange media has been described as being about 1.7 gpm/ft$^2$, flow velocities of 0.5 to 5 gpm/ft$^2$ may be employed under certain conditions if desired. Slower flow rates increase separation and peak concentrations at cost of volume treated per unit time; faster flow rates increase volume treated but decrease separation and peak concentrations. This is particularly true if the temperature of the dilution solution (deionized water) is raised to 50° C. The temperature of the dilution system has an effect on separation quality and temperatures of the order of from 5° C. to 80° C. may usefully be employed.

Any strong basic anion exchange resin may be used; however macroporous types such as Dow-M41 allow faster diffusion (higher kinetics) rates and therefore permit faster flow velocities. Resins with even higher porosities such as Rohm and Haas IRA-938 allow still

TABLE IV

| Product Acid w/ Chromium | Iron (III) chloride | Zinc chloride | Cadmium chloride* |
|---|---|---|---|
| 160 Gallons received: 5M Hydrochloric acid with: | 35 Gallons: $FeCl_3$ with: | 510 Gallons: $ZnCl_2$ with: | 35 Gallons: $CdCl_2$ with: |
| [Cr] = 97.8 ppm | [Cr] = <1 ppm | [Cr] = <1 ppm | [Cr] = <1 ppm |
| [Fe] = <1 ppm | [Fe] = 46.1 g/L | [Fe] = 15 ppm | [Fe] = <1 ppm |
| [Zn] = <1 ppm | [Zn] = 2 ppm | [Zn] = 2.95 g/L | [Zn] = 4 ppm |
| [Cd] = <1 ppm | [Cd] = <1 ppm | [Cd] = 3 ppm | [Cd] = 30 g/L |
| HCl recovery = 94.1% | recovery = 95.0% | recovery = 96.1% | recovery = 98.5% |
| HCl purity = 99.9% | purity = 99.98% | purity = 99.91% | purity = 99.97% |
| Cr recovery = 100.0% | | | |

*Cadmium analysis after stripping of Cadmium subsystem.

The present invention represents a novel way to separate heavy metal ions found in toxic waste solutions especially hydrochloric acid generated in the electrohigher flow velocities or provide better separation at similar flow velocities. Additionally, shorter sharpening section lengths may be utilized with higher kinetic resins.

The presence of complexing ions in the elution solution will slow down the process and increase the volume of regenerant required. However, this may be required in some separations where two metal species have similar distribution coefficients such as cupric and ferric ions. Also, the introduction into the top of the column of overlap from a previous cycle containing complexing ions and metal contaminants at the beginning of the elution phase enhances the separation of the metals while increasing the overall effectiveness of the process as the small percentage of waste (overlap) is recycled without further processing.

Metals that have been separated successfully by the described process to date are:

| In HCl, | | | | |
|---|---|---|---|---|
| Fe | Zn | Cd | | |
| Cr | Fe | Zn | Cd | where Cr remains in acid |
| Ni | Fe | Zn | Cd | where Ni remains in acid |
| Ni | Cu | Zn | Cd | where Ni remains in acid |
| Cr | Cu | Zn | Cd | where Cr remains in acid |
| Ni | Cu | Pb | Sn | where Ni remains in acid |
| Fe | Cu | Sb | Zn | |

It should be noted that the number of permutations and combinations given 40 plus metals in one complexating solution alone is astronomical. However, in every case so far attempted in the laboratory the outcome is easily predicted from the distribution coefficients given in the incorporated references. With these coefficients it is possible to predict the performance of the invention for many possible combinations of metal in these referenced complexing systems.

It is to be understood that the expression "complexating solutions" as used throughout the present specification and claims includes, but is not limited to, a metal plating solution, a cation exchange stripping solution, a solvent extraction stripping solution, a mineral or process leach solution, a circuit board manufacturing solution or other industrial process solution. The term "complexating solutions" also includes hydrochloric acid, hydrofluoric acid, hydroiodic acid, hydrobromic acid, or any other solution that forms one or more anionic transition metal complexes; and in which the metal contaminants are iron, zinc, cadmium, chromium, copper, nickel, tin, lead, silver, gold, mercury and any other metal that forms an anionic metal complex in the solution.

What is claimed is:

1. A chromatographic elution apparatus for use in the separation of metal ions on an anion exchange resin comprising a source of water, a source of metal bearing complexing solution, a column containing a loading section and a finishing section adjoined on the bottom of the loading section, said column an anion exchange resin for the purpose of adsorbing anionic metal complexes thereon, said loading section being greater than 30 inches in length, said finishing section being greater than 10 inches in length, means for delivering metal bearing complexating solution to the top of said column, means for delivering water to the top of said column and allowing both said solutions to flow downwardly through said resin, means programmed to control the flow velocity of said solutions as they exit said columns between 0.5 and 5.0 gallons per minute per square foot of column cross-sectional area, means programmed to elute with water to successively remove and separate the metals from each other as metal salts in solution, the design of said finishing section being to enhance the separation of the metal ions through extension of the natural chromatographic effects of the process and means for determining when the loading section has been fully loaded and control means programmed so that the loading cycle can be terminated prior to loading of the finishing section.

2. An apparatus according to claim 1 that includes sensor or detector suitable for detecting the presence of a particular metal ion present in the complexing solution.

3. An apparatus according to claim 1 that includes apparatus for sensing and controlling the level of the feed solution in the head space in the column above the ion exchange resin for the purpose of minimizing mixing of different solutions during transition between the loading cycle and the elution cycle or between any two cycles where the input solution to said column is changed, said apparatus consisting of a level control device or by visual detection through a view port in said column.

4. An apparatus according to claim 1 including means for controlling the pressure in the head space above the ion exchange resin whereby pressurized air is added to or vented from said column to maintain the necessary column pressure to achieve the desired flow velocity of solution through said column.

5. An apparatus according to claim 1 for detecting the individual metal fractions and purities as eluted from said column and areas for diverting said different metal-containing eluate solutions to appropriate storage tanks, said apparatus comprising one or more detectors capable of differentiating between the metal species present in the original solution.

6. An apparatus according to claim 1 whereby the entire apparatus is controlled automatically by an electronic computer responsive to the sensors for controlling the process.

7. An apparatus suitable for the chromatographic separation of a plurality of metal ions present in a complexating solution comprised of a solution of metal ion complexes in a complexing solution acid comprising a chromatographic column having an input at one end for receiving a fluid to be processed therein, an output at the opposite end thereof for withdrawing fluid therefrom, a first processing chamber intermediate the input and output ends containing a first bed of anion exchange resin in the dominate flow path of a fluid passing from the input toward the output of said column, a second processing chamber intermediate the first processing chamber and the output end of said column containing a second bed of ion exchange resin in said dominant flow path, input flow control means programmed to selectively control the flow of first and second fluids introduced into the input end of said column, a source of said complexating solution coupled to said first fluid input control means, a source of water coupled to said second fluid input control means, output flow control means for selectively controlling the flow of fluid out of the output of said column, a sensor for observing a sample of the fluid in said first chamber at the downstream end of said first bed of ion exchange resin, said sensor being responsive to the arrival of fluid introduced into the first bed for processing therein, wherein said sensor provides an output signal coupled to the input control means for switching from the first to second fluid input of the column when the arrival of said first fluid is detected at the downstream end of said first bed of anion exchange resin.

8. An apparatus according to claim 7 wherein said first and second processing chambers are adjacent sections of said chromatographic column and the first and second beds of ion exchange resin are located in said column substantially contiguous with one another.

9. An apparatus according to claim 7 wherein said sensor comprises an opacity detector including a light-emitting diode and a photodiode and wherein light passing from the light-emitting diode to the photodiode passes through the observed sample of the fluid at the downstream end of said first bed of ion exchange resin.

10. An apparatus according to claim 9 further comprising a plurality of storage containers and means including said output flow control means for selectively directing the flow of fluid from said column to a selected storage container in response to a signal derived from said sensor.

11. An apparatus according to claim 7 further comprising a plurality of storage containers and means including said output flow control means for selectively directing the flow of fluid from said column to a selected storage container in response to a signal derived from said sensor.

12. An apparatus according to claim 7 that includes apparatus for sensing and controlling the level of the feed solution in the head space in the column above the ion exchange resin for the purpose of minimizing mixing of different solutions during transition between the loading cycle and the elution cycle or between any two cycles where the input solution to said column is changed, said apparatus consisting of any standard level control device or by visual detection through a view port in said column.

13. The apparatus according to claim 7 wherein the source of water is a source of deionized water.

* * * * *